US011558670B2

(12) United States Patent
Venugopal et al.

(10) Patent No.: US 11,558,670 B2
(45) Date of Patent: Jan. 17, 2023

(54) PERSONALIZED MEDIA STREAMS

(71) Applicant: AT&T Intellectual Property I, L.P., Atlanta, GA (US)

(72) Inventors: Megha Venugopal, Union City, CA (US); Binny Asarikuniyil, Cerritos, CA (US)

(73) Assignee: AT&T Intellectual Property I, L.P, Atlanta, GA (US)

( * ) Notice: Subject to any disclaimer, the term of this patent is extended or adjusted under 35 U.S.C. 154(b) by 0 days.

(21) Appl. No.: 17/081,978

(22) Filed: Oct. 27, 2020

(65) Prior Publication Data
US 2022/0132210 A1 Apr. 28, 2022

(51) Int. Cl.
*H04N 21/458* (2011.01)
*H04N 21/462* (2011.01)
*H04N 21/475* (2011.01)
*H04N 21/442* (2011.01)
*H04N 21/4722* (2011.01)
*H04N 21/472* (2011.01)

(52) U.S. Cl.
CPC ... *H04N 21/4583* (2013.01); *H04N 21/44204* (2013.01); *H04N 21/4621* (2013.01); *H04N 21/4722* (2013.01); *H04N 21/4755* (2013.01); *H04N 21/47214* (2013.01)

(58) Field of Classification Search
CPC ......... H04N 21/4583; H04N 21/47214; H04N 21/4621; H04N 21/4755; H04N 21/4722; H04N 21/44204
See application file for complete search history.

(56) References Cited

U.S. PATENT DOCUMENTS

| 4,717,970 A * | 1/1988 | Long ................. H04N 7/16 386/314 |
| 7,689,995 B1 * | 3/2010 | Francis .......... H04N 21/4583 718/104 |
| 2001/0051037 A1 * | 12/2001 | Safadi ................. H04N 19/40 348/E5.103 |
| 2002/0057891 A1 * | 5/2002 | Shigaki ................. G11B 27/36 725/63 |
| 2005/0273815 A1 * | 12/2005 | Orr ................. H04N 5/445 725/52 |

(Continued)

FOREIGN PATENT DOCUMENTS

| CN | 1118474 A * | 3/1996 | ............ H04L 29/06 |
| JP | H08185687 A * | 7/1996 | |
| JP | 2007180633 A * | 7/2007 | |

*Primary Examiner* — Robert J Hance

(57) ABSTRACT

A method for providing a personalized media stream includes receiving a signal from a user to launch a personalized media stream, determining a current time, identifying a first time slot of a schedule into which the current time falls, identifying a first channel that is associated with the first time slot, wherein viewing history for the user indicates that the user has viewed the first channel during the first time slot in the past, automatically tuning the display device to the first channel in response to the signal, receiving, subsequent to the automatically tuning, a command from the user to pause a program playing on the first channel, identifying a second channel associated with a second time slot, wherein the second time slot occurs later in time that the first time slot, and buffering a portion of a program being shown on the second channel during the second time slot.

20 Claims, 5 Drawing Sheets

(56) References Cited

U.S. PATENT DOCUMENTS

| | | | |
|---|---|---|---|
| 2009/0327894 A1* | 12/2009 | Rakib | H04N 21/234318 709/219 |
| 2010/0333164 A1* | 12/2010 | Schultz | H04N 21/4347 386/E5.028 |
| 2012/0057853 A1* | 3/2012 | Huber | H04N 21/4825 386/292 |
| 2012/0222065 A1* | 8/2012 | Prins | H04N 21/44209 725/32 |
| 2015/0358661 A1* | 12/2015 | Navarro | H04N 21/2665 725/59 |

* cited by examiner

| | 8:00 AM – 8:50 AM | 8:50 AM – 10:00 AM | 10:00 AM – 11:00 AM | 11:00 AM – 12:00 PM | 12:00 PM – 1:00 PM | 1:00 PM – 2:00 PM | 2:00 PM – 3:00 PM | 3:00 PM – 4:00 PM | 4:00 PM – 5:00 PM |
|---|---|---|---|---|---|---|---|---|---|
| MONDAY | Cable News A | Cable News A | | | | | Kids Channel C | Kids Channel C | |
| TUESDAY | Cable News A | Cable News A | | 306 | | | Kids Channel C | Kids Channel C | |
| WEDNESDAY | Cable News A | Cable News A | | | | | Kids Channel C | Kids Channel C | |
| THURSDAY | Cable News A | Cable News A | | | | | Kids Channel C | Kids Channel C | |
| FRIDAY | Cable News A | Cable News A | | | | | Kids Channel C | Kids Channel C | |
| SATURDAY | Cartoons B | Cartoons B | | | | | | | Cable Movie D |
| SUNDAY | Cartoons B | Cartoons B | | | | | | | Cable Movie D |

FIG. 3

PERSONALIZED MEDIA STREAMS

The present disclosure relates generally to digital media distribution, and relates more particularly to devices, non-transitory computer-readable media, and methods for providing media streams in the form of television channels that are personalized for specific users.

BACKGROUND

Television service providers, including providers of cable television services, satellite television services, fiber optic television services, digital streaming television services, and the like, may offer hundreds of different channels that can be accessed by subscribers. For instance, subscribers may subscribe to specific packages that allow access to all or a subset of the available channels. These specific packages may include a base package (e.g., including network television and/or basic cable channels), a package that includes one or more premium movie channels, a package that includes one or more premium sports channels, and/or other types of packages.

SUMMARY

In one example, a method for providing a personalized media stream is performed by a processing system including at least one processor. The method includes receiving a signal from a user via an input device indicating that the user wishes to launch a personalized media stream on a display device of the user, determining a current time, identifying a first time slot of a schedule into which the current time falls, wherein the schedule comprises a plurality of time slots including the first time slot, identifying a first channel that is associated in the schedule with the first time slot, wherein the first channel is one of a plurality of channels, and wherein viewing history data for the user indicates that the user has viewed the first channel during the first time slot in the past, automatically tuning the display device of the user to the first channel in response to the signal, receiving, subsequent to the automatically tuning, a command from the user via the input device to pause a program playing on the first channel, identifying a second channel associated in the schedule with a second time slot of the plurality of time slots, wherein the second time slot occurs later in time that the first time slot, and buffering a portion of a program being shown on the second channel during the second time slot, when the second time slot begins, wherein the buffering begins while the display device is still tuned to the first channel.

In another example, a device includes a processing system including at least one processor and a computer-readable medium storing instructions which, when executed by the processing system, cause the processing system to perform operations. The operations include receiving a signal from a user via an input device indicating that the user wishes to launch a personalized media stream on a display device of the user, determining a current time, identifying a first time slot of a schedule into which the current time falls, wherein the schedule comprises a plurality of time slots including the first time slot, identifying a first channel that is associated in the schedule with the first time slot, wherein the first channel is one of a plurality of channels, and wherein viewing history data for the user indicates that the user has viewed the first channel during the first time slot in the past, automatically tuning the display device of the user to the first channel in response to the signal, receiving, subsequent to the automatically tuning, a command from the user via the input device to pause a program playing on the first channel, identifying a second channel associated in the schedule with a second time slot of the plurality of time slots, wherein the second time slot occurs later in time that the first time slot, and buffering a portion of a program being shown on the second channel during the second time slot, when the second time slot begins, wherein the buffering begins while the display device is still tuned to the first channel.

In another example, a computer-readable medium stores instructions which, when executed by a processing system including at least one processor, cause the processing system to perform operations. The operations include receiving a signal from a user via an input device indicating that the user wishes to launch a personalized media stream on a display device of the user, determining a current time, identifying a first time slot of a schedule into which the current time falls, wherein the schedule comprises a plurality of time slots including the first time slot, identifying a first channel that is associated in the schedule with the first time slot, wherein the first channel is one of a plurality of channels, and wherein viewing history data for the user indicates that the user has viewed the first channel during the first time slot in the past, automatically tuning the display device of the user to the first channel in response to the signal, receiving, subsequent to the automatically tuning, a command from the user via the input device to pause a program playing on the first channel, identifying a second channel associated in the schedule with a second time slot of the plurality of time slots, wherein the second time slot occurs later in time that the first time slot, and buffering a portion of a program being shown on the second channel during the second time slot, when the second time slot begins, wherein the buffering begins while the display device is still tuned to the first channel.

BRIEF DESCRIPTION OF THE DRAWINGS

The teachings of the present disclosure can be readily understood by considering the following detailed description in conjunction with the accompanying drawings, in which:

FIG. 3 illustrates a portion of an example user-specific schedule that may be created for an example user;

To facilitate understanding, identical reference numerals have been used, where possible, to designate identical elements that are common to the figures.

DETAILED DESCRIPTION

Figure 1:
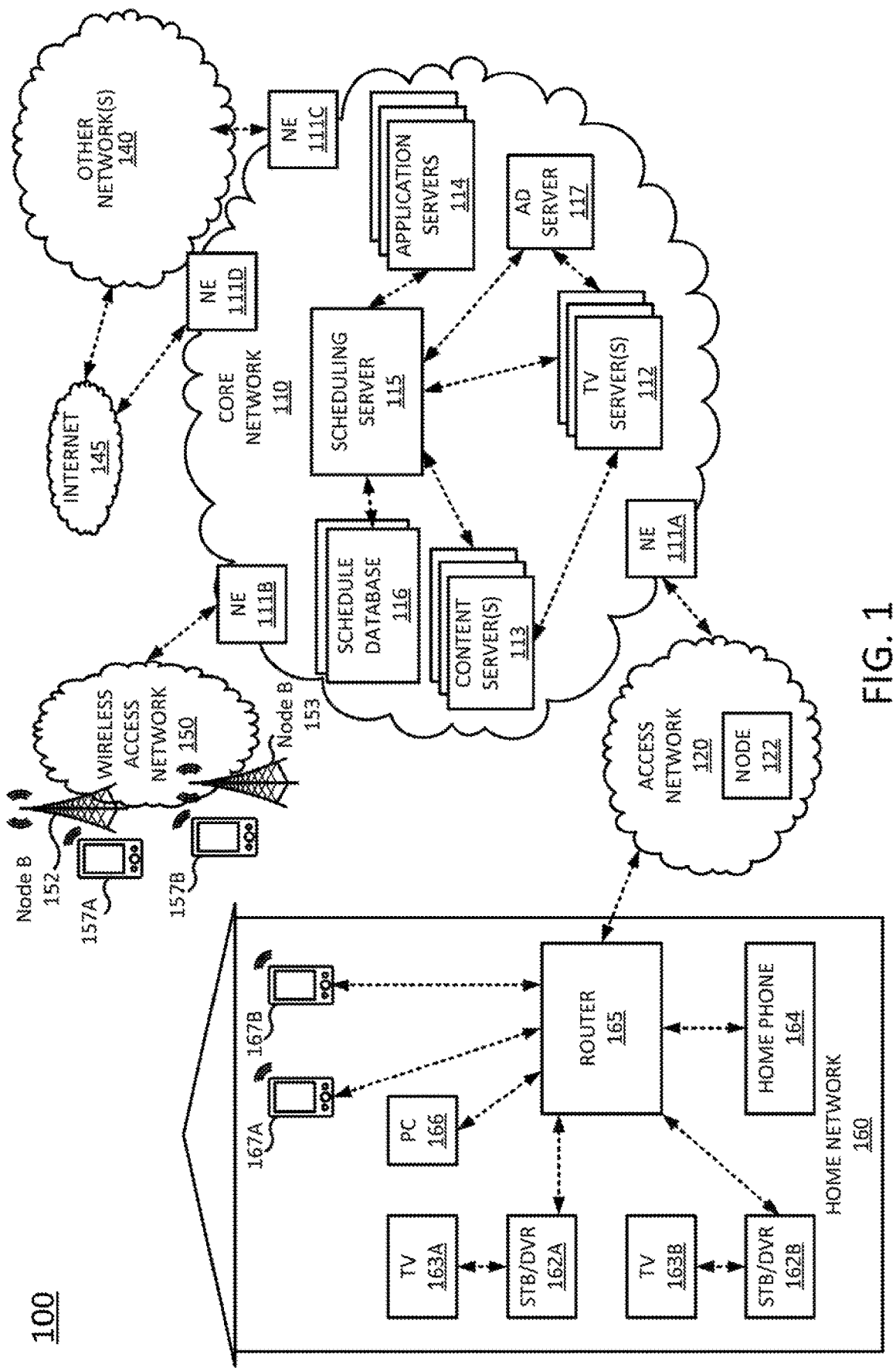
FIG. 1 illustrates an example network related to the present disclosure.

In one example, the present disclosure provides media streams in the form of television channels that are personalized for specific users. As discussed above, television service providers, including providers of cable television services, satellite television services, fiber optic television services, digital streaming television services, and the like, may offer hundreds of different channels that can be accessed by subscribers. Despite access to hundreds of channels, however, a subscriber may in reality watch only a small subset (e.g., a dozen or less) of these channels on a regular basis. Moreover, the subscriber may regularly watch specific channels at specific times of day. For instance, the subscriber may regularly watch a specific cable news channel from 7:00 AM to 8:00 AM on weekdays, a specific premium movie channel from 9:00 PM to 11:00 PM on weekdays, and a specific cable sports channel on Sundays from 1:00 PM to 7:00 PM. To switch from one program or one channel to another, the subscriber must typically manually tune the channel (e.g., by entering the number of the new channel via a remote control or making a selection via a graphical user interface (GUI) that displays a channel guide).

Examples of the present disclosure provide television channels that are personalized for specific users or subscribers. In one example, a user's television viewing habits are observed to detect patterns, e.g., to determine which channels the user watches most often and when the user tends to watch these channels (e.g., specific days of the week and/or specific times). These patterns may serve as the basis for a user-specific schedule, where the user-specific schedule indicates at least one time window and a channel associated with that time window. For instance, if the user is observed to watch a specific cable news channel from 7:00 AM to 8:00 AM on weekdays, then the user-specific schedule may indicate a time window of 7:00 AM to 8:00 AM, on Mondays through Fridays, where the associated channel is the specific cable news channel.

Once the user-specific schedule is constructed, the user may launch a personalized channel on his or her television (or other devices that are capable of receiving and displaying television content). For instance, a specific channel (e.g., channel 1000) may be dedicated to serving personalized channels, or a menu on a graphical user interface may provide the user with an option to launch the personalized channel, similar to a video on demand (VOD) feature. When the user launches the personalized channel, the personalized channel will automatically (i.e., without further action or input from the user) tune to the channel that is indicated in the user's user-specific schedule for the current time window. Thus, for instance, if the user launches the personalized channel at 7:05 AM on a Wednesday, and the user-specific schedule associates a specific cable news channel with the time window of 7:00 AM to 8:00 AM on weekdays, the personalized channel may automatically tune the user's television to the specific cable news channel, such that the television displays the current program on the specific cable news channel.

Thus, in one example, multiple channels may be distributed as multiple manifests of a playlist. In a further example, an artificially intelligent agent in a network (e.g., on the server side of the network) may intelligently construct the individualized playlist and deliver the individualized playlist to the playback device (e.g., a user endpoint device). The playback device may subsequently present the playlist as a media stream, such that each item in the playlist appears to be coming from a single source or channel.

Within the context of the present disclosure, the term "channel" is understood to refer to a television channel, i.e., a terrestrial frequency or virtual number over which a television station or television network is distributed. For instance, a digital terrestrial television channel may correspond to a specific band of carrier frequencies, such that a device that is tuned to a carrier frequency within that specific band will receive content associated with the digital terrestrial television channel. Similarly, a satellite television channel may correspond to a specific satellite transponder, such that a device that is tuned to the specific transponder will receive content associated with the satellite television channel.

To better understand the present disclosure, FIG. 1 illustrates an example network 100 related to the present disclosure. As shown in FIG. 1, the network 100 may comprise a content distribution network (e.g., data network) that connects mobile devices 157A, 157B, 167A and 167B, and devices such as set-top boxes (STBs) 162A, and 162B, television (TV) 163A and TV 163B, router 165, personal computer (PC) 166, and so forth, with one another and with various other devices via a core network 110, a wireless access network 150 (e.g., a cellular network), an access network 120, other networks 140 and/or the Internet 145. Mobile devices 157A, 157B, 167A and 167B, and devices such as set-top boxes (STBs) 162A, and 162B, television (TV) 163A and TV 163B, router 165, and personal computer (PC) 166 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a global positioning system (GPS), a portable gaming device, a wearable smart device (e.g., a smart watch or a fitness tracker), a satellite radio receiver or satellite television receiver, or any other device having a user interface that is capable of receiving bandwidth from the network 100 in the form of streaming data. In one example, any one or more of mobile devices 157A, 157B, 167A, and 167B may have both cellular and non-cellular access capabilities and may further have wired communication and networking capabilities. Any one or more of mobile devices 157A, 157B, 167A, and 167B may have installed thereon a television content distribution application that allows the user of the mobile device to access digital television content such as television shows, movies, video on demand programs, and the like from his or her television content provider (e.g., a cable television service provider, a satellite television service provider, etc.).

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services.

Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a scheduling server 115, and a schedule database (DB) 116. For ease of illustration, various additional elements of core network 110 are omitted from FIG. 1.

With respect to television service provider functions, core network 110 may include one or more third party television (TV) servers 112 for the delivery of television content. In this regard, television servers 112 may interact with content servers 113 and advertising server 117 to select which video programs, or other content and advertisements to provide to the home network 160, to the mobile devices 157A, 157B, 167A, and 167B, and to other downstream viewing locations.

In one example, content servers 113 may store scheduled television content for a number of third party television content providers, video-on-demand programming, local programming content, and so forth. For example, third party television content providers may upload various contents to the core network to be distributed to various subscribers. Alternatively, or in addition, third party television content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160, via the mobile devices 157A, 157B, 167A, and 167B, and at other downstream viewing locations. For example, advertisers may upload various advertising content to the core network 110 to be distributed to various viewers.

The scheduling server 115 performs operations, discussed in greater detail below in connection with FIG. 2, related to presenting television channels that are personalized for specific users. For example, the scheduling server 115 may monitor a user's viewing habits (e.g., channels and/or programs viewed) in order to detect viewing patterns that are specific to the user. For instance, as discussed above, the scheduling server 115 may detect that the user regularly watches a specific cable news channel from 7:00 AM to 8:00 AM on weekdays, a specific premium movie channel from 9:00 PM to 11:00 PM on weekdays, and a specific cable sports channel on Sundays from 1:00 PM to 7:00 PM. From these viewing patterns, the scheduling server 115 may construct a user-specific schedule for the user, where the user-specific schedule indicates at least one time window and a channel associated with that time window. For instance, if the user is observed to watch a specific cable news channel from 7:00 AM to 8:00 AM on weekdays, then the user-specific schedule may indicate a time window of 7:00 AM to 8:00 AM, on Mondays through Fridays, where the associated channel is the specific cable news channel.

The scheduling server 115 may store the user-specific schedule in the schedule DB 116, where the schedule DB 116 may store a plurality of user-specific schedules for a plurality of different users or subscribers of television service provider. The user-specific schedules stored in the schedule DB 116 may be indexed by one or more user-specific identifiers (e.g., name, account number, or some other sort of unique identifier) that makes it easy to identify the user-specific schedule associated with any given user of the plurality of different users. The user-specific schedules may be stored in encrypted form to protect the privacy of the users. The scheduling server 115 may also store a copy of the user-specific schedule on one of more of the user's devices that is capable of receiving and displaying television content (e.g., one of mobile devices 157A, 157B, 167A, and 167B; STBs 162A and 162B; TVs 163A and 163B; router 165; or PC 166).

Figure 5:
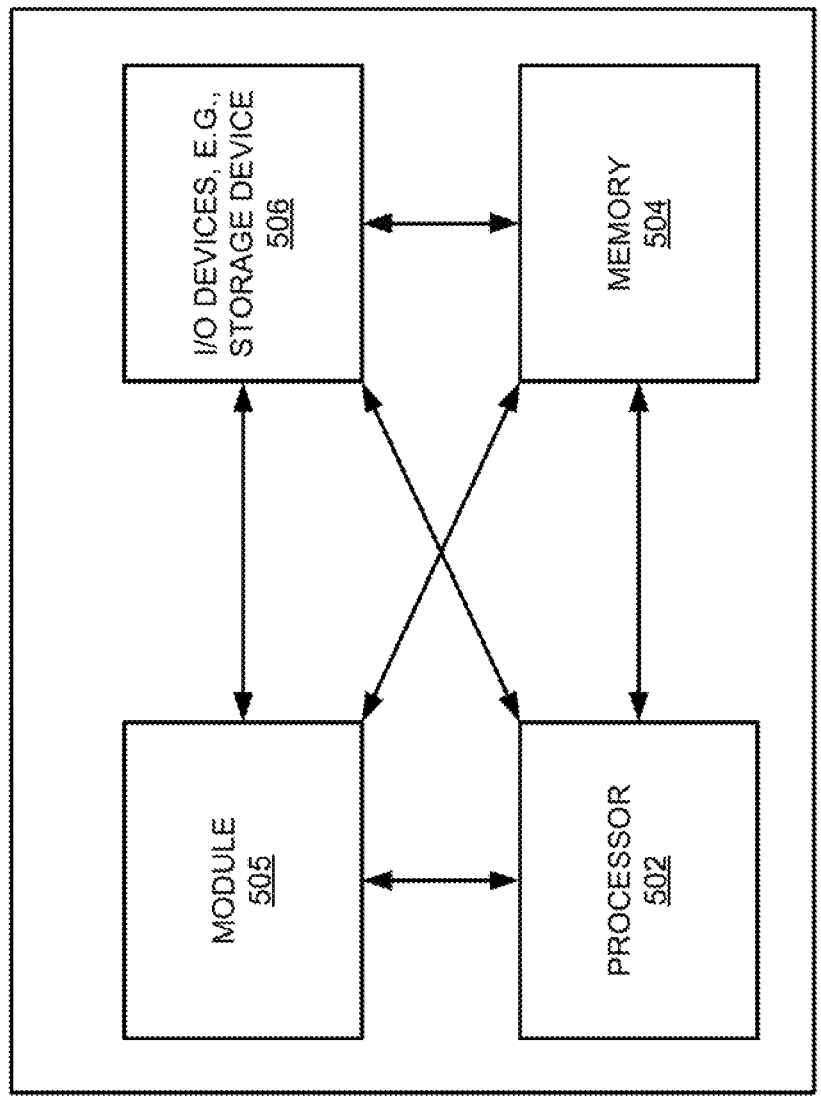
FIG. 5 depicts a high-level block diagram of a computing device specifically programmed to perform the functions described herein.

In one example, any or all of the television servers 112, content servers 113, application servers 114, scheduling server 115, and advertising server 117 may comprise a computing system, such as computing system 500 depicted in FIG. 5.

In one example, the access network 120 may comprise a Digital Subscriber Line (DSL) network, a Local Area Network (LAN), a cellular or wireless access network, a $3^{rd}$ party network, and the like. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to communications with web servers via the Internet 145 and/or other networks 140, and so forth.

In one example, home network 160 may include a router 165, which receives data/communications associated with different types of media, e.g., television, phone, and Internet, and separates these communications for the appropriate devices. The data/communications may be received via access network 120, for instance. In one example, television data files are forwarded to set-top boxes (STBs)/digital video recorders (DVRs) 162A and 162B to be decoded, recorded, and/or forwarded to television (TV) 163A and TV 163B for presentation. Similarly, Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. Each of these devices may be configured to support media content of particular file formats. In one example, router 165 may further communicate with TV (broadly a display) 163A and/or 163B, e.g., where one or both of the televisions is a smart TV. TVs 163A and/or 163B may also be configured to support media content of particular file formats. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

One or more of the mobile devices 157A, 157B, 167A, and 167B; STBs 162A and 162B; TVs 163A and 163B; router 165; or PC 166 may be capable of receiving and/or displaying television content, e.g., as delivered by the TV server 112. For instance, one or more of the mobile devices 157A, 157B, 167A, and 167B or PC 166 may execute an application associated with a television service provider. The application may allow a user to access a subscriber account associated with the television service provider via the mobile device(s), so that the user may watch television programming on the mobile device(s). STBs 162A and 162B or router 165 may receive signals from the TV servers 112 and extract television programming from the signals for display on the TVs 163A and 163B. Alternatively, if one of the TVs 163A and 163B is a smart television, the TV(s) may be able to directly receive the signals from the TV servers 112 and extract the television programming.

Furthermore, one or more of the mobile devices 157A, 157B, 167A, and 167B; STBs 162A and 162B; TVs 163A and 163B; router 165; or PC 166 may store a user-specific schedule for a user, as constructed by the scheduling server 115 as discussed above. Thus, one or more of the mobile devices 157A, 157B, 167A, and 167B; STBs 162A and 162B; TVs 163A and 163B; router 165; or PC 166 may receive a signal from a user indicating that the user wishes to view a personalized channel and identify, based on the user-specific schedule, a channel that is associated with the current time. For instance, as discussed above, the viewer-specific schedule may associate different channels with different time slots. The one or more of the mobile devices 157A, 157B, 167A, and 167B; STBs 162A and 162B; TVs 163A and 163B; router 165; or PC 166 may identify the time slot into which the current time falls (e.g., a current time of 7:05 AM may fall into the time slot of 7:00 AM to 8:00 AM), and may then identify the channel that is associated with the time slot. The one or more of the mobile devices 157A, 157B, 167A, and 167B; STBs 162A and 162B; TVs 163A and 163B; router 165; or PC 166 may then automatically tune to the channel that is associated with time slot into which the current time falls. The automatic tuning may be repeated until the user turns off or otherwise terminates the personalized channel. Thus, as long as the personalized channel is activated or enabled, the one or more of the mobile devices 157A, 157B, 167A, and 167B; STBs 162A and 162B; TVs 163A and 163B; router 165; or PC 166 may automatically tune from one channel to another throughout the day, according to the user-specific schedule.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
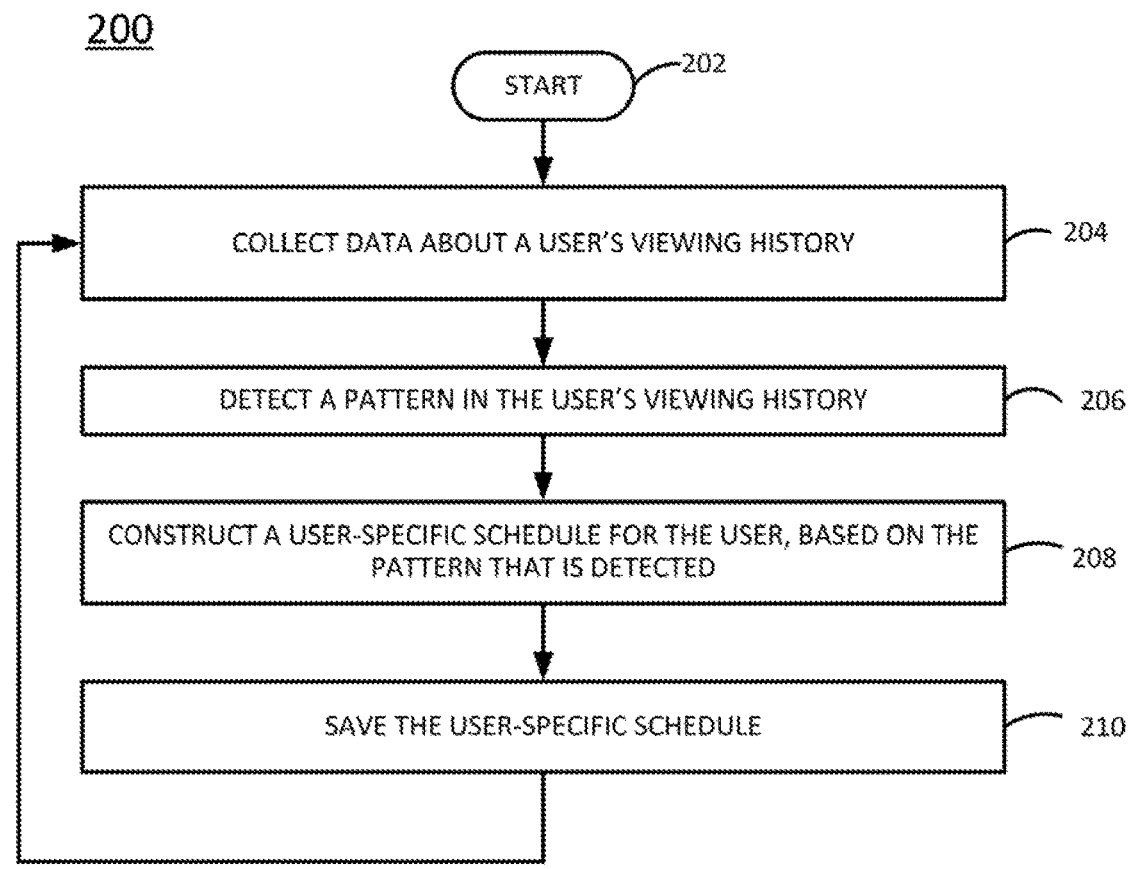
FIG. 2 illustrates a flowchart of an example method for constructing a user-specific schedule for use in providing a channel that is personalized for a user.

To further aid in understanding the present disclosure, FIG. 2 illustrates a flowchart of an example method 200 for constructing a user-specific schedule for use in providing a channel that is personalized for a user. In one example, the method 200 may be performed by the scheduling server 115 and/or additional devices illustrated in FIG. 1. However, in other examples, the method 200 may be performed by another device or devices (e.g., one or more application servers 114 or other device(s), such as the computing device 500 illustrated in FIG. 5). As such, any references in the discussion of the method 200 to components of FIG. 1 are not intended to limit the means by which the method 200 may be performed. For the sake of example, the method 200 is described as being performed by a processing system including at least one processor.

The method 200 begins in step 202. In step 204, the processing system may collect data about a user's viewing history. In one example, the data may be collected over a network (e.g., a radio access network) from at least one user endpoint device that is capable of receiving signals and/or content from a television service provider. For instance, the user endpoint device(s) may include a smart television, a set top box, a streaming media player, a microconsole (e.g., a dongle or similar device that plugs into a high definition multimedia interface (HDMI) port), a smart phone, a tablet computer, or the like which has access to viewing information.

The data about the user's viewing history may include information about what channels and/or programs the user has watched and when, and the data may be collected over a period of time (e.g., a week, several weeks, a month, etc.). For instance, the viewing history may indicate every program that the user watched over the period of time, including the channel on which the program aired and the day and time at which the program aired. For instance, a data point in the viewing history may indicate that the user watched a professional football game from 8:00 PM to 11:00 PM on a specific Monday night and on a specific cable sports channel.

In one example, the viewing history may be specific to a given subscription or account that is associated with multiple users (e.g., a family who shares access to the user endpoint device(s)). In a further example, however, the viewing history may identify users at a more granular level. For instance, where the viewing history includes programs that were aired via services that allow multiple users in the same household to create their own individual profiles, the viewing history may include the profile associated with one or more data points (i.e., which profile was logged in when the program was watched), where profile information is available. Thus, the term "user" in the context of the present disclosure may refer to a specific individual or to a specific group of individuals associated with the same television service provider account or subscription.

In one example, the viewing history may include playback events and recording request events, in addition to programs that were watched live. In other words, where the user endpoint device(s) includes digital video recorder (DVR) capabilities, the viewing history may include programs for which the user requested recording and recorded programs that the user watched at a time subsequent to the program's original time of airing. In the case of recorded or played back programs, the data point may include both the day and time at which the program originally aired (e.g., day and time that recording occurred) and the day and time at which the user watched the recording of the program.

In step 206, the processing system may detect a pattern in the user's viewing history. In one example, one or more machine learning techniques may be used to detect the pattern. For instance, by analyzing the viewing history over the period of time, the processing system may detect that the user watches a specific cable news channel from 7:00 AM to 8:00 AM on weekdays, a specific premium movie channel from 9:00 PM to 11:00 PM on weekdays, and a specific cable sports channel on Sundays from 1:00 PM to 7:00 PM.

In one example, the processing system may detect different patterns of usage based on different days of the week, different times of day, and/or holiday periods. For instance, the user may frequently watch a specific cable news network during the day on weekdays (e.g., 10:00 A.M. to 3:00 PM). However, on weekends and weekdays that are school holidays, the user may be more likely to watch a specific cable kids' channel during the same window of time. Additionally, on weekday evenings (e.g., 7:00 PM to 10:00 PM), the user may frequently watch a specific cable sports channel.

In step 208, the processing system may construct a user-specific schedule for the user, based on the pattern detected in step 206. In one example, the user-specific schedule may comprise a schedule that includes, for at least one day (e.g., a day of the week, such as Monday, or a specific calendar day, such as Sep. 1, 2020), a plurality of specific windows of time during the day. FIG. 3, for instance, illustrates a portion of an example user-specific schedule 300 that may be created for an example user. The portion of the example user-specific schedule 300 covers from 8:00 AM to 5:00 PM for each day of the week (i.e., Monday to Sunday) and is arranged as a grid comprising a plurality of rows and a plurality of columns. In one example, the rows of the example user-specific schedule may correspond to days of the week (e.g., as in the case where the reference numeral 302 indicates a row associated with Monday), while the columns of the example user-specific schedule 300 may correspond to specific windows of time (e.g., as in the case where the reference numeral 304 indicates a column associated with 8:00 AM to 9:00 AM). Cells of the grid (e.g., where the reference numeral 306 indicates one cell) indicate time slots, where each time slot is defined by the day and the window of time whose row and column, respectively, intersect at the corresponding cell.

The windows of time may be of equal duration (e.g., twenty four one-hour time slots, forty eight thirty-minute time slots, etc.). However, in other examples, the durations of the plurality of windows of time may vary (e.g., some windows of time may have one-hour durations, while other windows of time may have thirty-minute durations).

As discussed above, each time slot may be associated with a specific television channel. In FIG. 3, each cell of the grid may contain data indicating a channel that is associated with the time slot indicated by the cell. For instance, in FIG. 3, the channel Cable News A is associated with the time slot of 8:00 AM to 9:00 AM on Mondays (as well as with a plurality of other time slots).

In one example, the television channel associated with a given time slot may comprise a television channel that the user has been observed to frequently watch during the given time slot. For instance, the processing system may determine, based on the pattern detected in step 206, that the channel most frequently watched by the user during the time slot of 7:00 AM to 8:00 AM on Mondays is a specific cable news channel. This specific cable news channel may then be associated with the time slot of 7:00 AM to 8:00 AM on Mondays for the user's user specific schedule. Thus, in one example, the channel associated with a given time slot is the channel that was most frequently watched during the time slot over the period of time for which the user's viewing history data was collected.

As illustrated in FIG. 3, some time slots of the user-specific schedule may be empty after detecting patterns in step 206. An empty time slot may indicate that the user does not typically watch any television channels during that time slot, or that there is not enough information among the data collected in step 204 to make a determination about the time slot. In one example, the processing system may make recommendations in these empty time slots. For instance, the processing system may be able to infer, based on the user's viewing history, that the user watches multiple television shows of a particular genre (e.g., sitcom, drama, reality, etc.) or multiple programs featuring a particular actor or other personality (e.g., news anchor, game show host, writer, sports team, etc.). The processing system may insert into an empty time slot a channel that shows, during the empty time slot, a program that the user is expected to enjoy (e.g., a television show of the particular genre or that shares some other commonalities with the user's viewing history). The program that the user is expected to enjoy may be identified based on metadata similarities between the program and other programs included in the user-specific schedule, or based on the fact that other users whose viewing histories share a threshold similarity to the user (e.g., x percent of the same programs and/or channels watched) also watch the program. In further examples, the processing system may insert advertising or sponsored material into the empty time slots. In further examples still, the processing system may insert user-generated content, such as the user's own photos or videos, into the empty time slots (where the user-generated content may be accessed from another device in the user's home network). In further examples still, the processing system may insert information related to a recent Internet search executed by the user (e.g., advertisements for products or services recently searched for) into the empty time slots.

In further examples still, the processing system may insert programs or channels into an empty time slot that are excluded from or not normally part of the user's subscription package. For instance, the user may not subscribe to a premium movie channel, but the processing system may associate the premium movie channel with an empty time slot of the user-specific schedule, thereby allowing the user limited access to the premium movie channel only during the time slot with which the premium movie channel is associated, and only when the personalized channel is activated. In this case, the premium movie channel may be advertisement-sponsored, meaning that advertisements for a particular entity which sponsors the limited access may also be shown during the time slot.

In one example, the processing system may request user input before filling an empty time slot. For instance, the processing system may recommend a plurality of possible content items (e.g., programs, channels, advertisements, user-generated content) to fill the empty time slot, and may ask the user to select one (or none) of the content items to fill the empty time slot. In another example, the user may proactively request that a particular content item be inserted into an empty time slot, when reviewing the user-specific schedule. It should also be noted that the user-specific schedule can be further modified based on user request. For instance, the user may request that the channels associated with one or more time slots be removed from the user-specific schedule or replaced with different channels. The user may also request that one or more channels be added in particular time slots of the user-specific schedule.

In step 210, the processing system may save the user-specific schedule. In one example, the user-specific schedule is stored in a database that stores user-specific schedules for a plurality of television service provider subscribers. In another example, the processing system may deliver the user-specific schedule, over a network, to the endpoint device(s) from which the viewing history data was collected in step 204. As discussed in further detail below in connection with FIG. 4, the endpoint device(s) may use the user-specific schedule to deliver a channel that is personalized for the viewer.

The method may then return to step 204, and the processing system may proceed as described above to continue collecting viewing history data. Thus, the processing system may iterate through steps 204-210 in order to continuously monitor the user's viewing habits and may refine the user-specific schedule accordingly. For instance, if the user's viewing habits change, the processing system may detect new patterns in the viewing history data and may modify the user's user-specific schedule to reflect these new patterns.

In one example, continuous iteration of the method 200 does not necessarily mean that every step of the method 200 is repeated with the same frequency. For instance, viewing history data for the user may be collected on a continuous basis, or on a periodic basis with a first frequency (e.g., daily). However, the viewing history data may not be analyzed for patterns until a sufficient amount of data has been collected to yield meaningful results. Thus, pattern detection and user-specific schedule construction may be performed on a periodic basis with a second frequency that is less frequent that the first frequency (e.g., weekly).

In some cases, if there are multiple channels that can potentially be associated with the same time slot (e.g., if the user does not watch one channel exclusively during the time slot, or the user's viewing habits during the time slot are in the process of shifting), then the processing system may present the user with the option to choose which channel is associated with the time slot. Optionally, the channel that is not associated with the time slot may still be recorded for later viewing.

Figure 4:
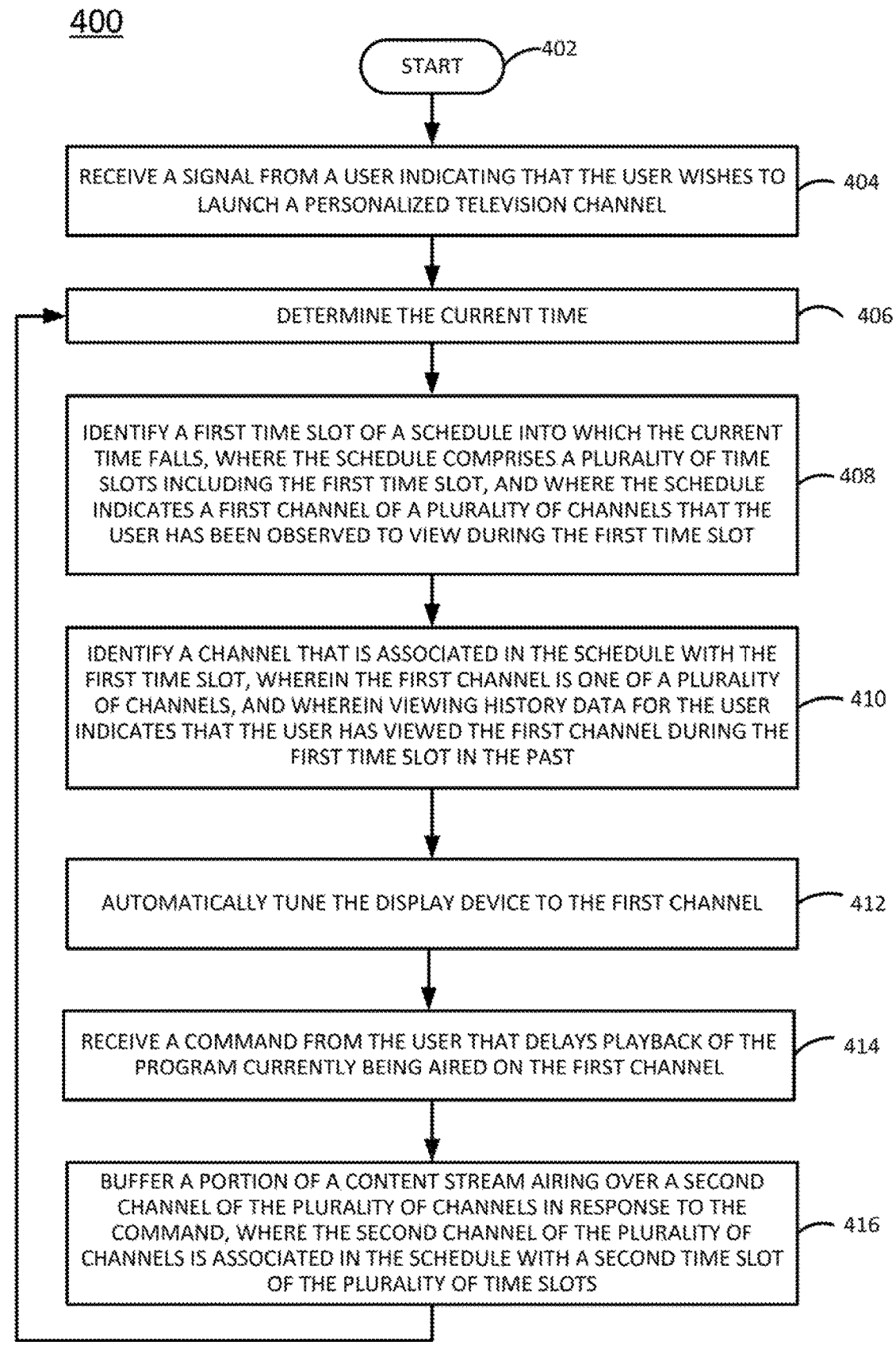
FIG. 4 illustrates a flowchart of an example method for providing a channel that is personalized for a user.

FIG. 4 illustrates a flowchart of an example method 400 for providing a channel that is personalized for a user. In one example, the method 400 may be performed by one of mobile devices 157A, 157B, 167A, and 167B; STBs 162A and 162B; TVs 163A and 163B; router 165; or PC 166, and/or by additional devices illustrated in FIG. 1. However, in other examples, the method 400 may be performed by another device or devices (e.g., one or more application servers 114 or other device(s), such as the computing device 500 illustrated in FIG.). As such, any references in the discussion of the method 400 to components of FIG. 1 are not intended to limit the means by which the method 400 may be performed. For the sake of example, the method 400 is described as being performed by a processing system including at least one processor.

The method 400 begins in step 402. In step 404, the processing system may receive a signal from a user via an input device (e.g., any of the user endpoint devices discussed above or an input component (e.g., a key pad, a remote controller, a camera for recognizing user gestures, a microphone for recognizing verbal commands, and so on) that is part of the display device, smart TV, set-top box and so on) indicating that the user wishes to launch a personalized television channel (e.g., a personalized media stream) on a display device of the user. For instance, the user may send the signal by tuning the display device to a specific channel (e.g., channel 1000). Alternatively, the user may send the signal by pressing a dedicated button or series of buttons on a remote control, or by selecting a menu option via a GUI of the display device. Step 404 may be performed when the personalized television channel is initially launched; however, once the personalized television channel is launched, the method 400 may iterate through the remaining steps of the method 400 one or more times, without any further requests from the user to launch the personalized television channel.

In step 406, the processing system may determine a current time, which, if the personalized television channel is being initially launched, maybe the time at which the signal was received. For instance, the processing may be synchronized, over a network, to a remote clock. When the signal is received, the processing system may determine the time based on the synchronization to the remote clock. Alternatively, the device that generated the signal may include a timestamp in the signal itself, so that the processing system may simply extract the timestamp from the signal.

In some examples, however, the personalized television channel may have already been launched. In this case, the current time may not be associated with any signal received from the user. The current time may instead be determined simply by determining the time based on the synchronization to the remote clock. In one example, the processing system may periodically determine the synchronization to the remote clock (e.g., every x minutes). However, in another example, the processing system may determine the synchronization to the remote clock according to a pre-defined schedule (e.g., every thirty minutes, on the hour and the half hour). In further examples, synchronization to the remote clock may be determined in response to a user command or in response to a predefined event (e.g., the user requesting that the personalized television channel be launched.

In step 408, the processing system may identify a first time slot of a schedule (e.g., a user-specific schedule) into which the current time falls, where the schedule comprises a plurality of time slots including the first time slot, and where the schedule indicates a first channel of a plurality of channels that the user has been observed to view during the first time slot.

As discussed above, a user-specific schedule may be constructed for the user, based on patterns that have been detected in the user's viewing habits. The user-specific schedule may include a schedule for each day of the week (e.g., Sunday-Saturday) or for each calendar day (January 1-December 31). Each day may be further broken down into a plurality of time slots, where each time slot defines a window of time (e.g., thirty minutes, one hour, etc.) during the day. At least one of these time slots may be associated with a specific channel, where the specific channel may be a channel that the user has been observed to regularly watch during the associated time slot. For instance, if the user has been observed to regularly watch a specific cable sports channel on Monday nights between 8:00 PM and 11:00 PM, then time slots of 8:00 PM to 9:00 PM, 9:00 PM to 10:00 PM, and 10:00 PM to 11:00 PM on a Monday of the user's user-specific schedule may be associated with the specific cable sports channel. Thus, if the current time is 8:10 PM on a Monday night, the processing system may determine that the time of 8:10 PM falls into the time slot of 8:00 PM to 9:00 PM.

In step 410, the processing system may identify a first channel that is associated in the schedule with the first time slot, wherein the first channel is one of a plurality of channels, and wherein viewing history data for the user indicates that the user has viewed the first channel during the first time slot in the past. As discussed above, the user-specific schedule may associate one or more time slots with respective channels. For instance, a time slot of 7:00 AM to 8:00 AM on weekdays may be associated with a specific cable news channel, whereas a time slot of 1:00 PM to 4:00 PM on Sundays may be associated with a specific cable sports channel.

In step 412, the processing system may automatically tune the display device (or a device connected to the display device which includes a tuner) to the first channel in response to the signal received in step 404. For instance, where the tuner is an advanced television systems committee (ATSC) tuner, the processing system may send a signal to the tuner of the display device that causes the tuner to select, from a band of transmitted radio frequency (RF) signals, a specific RF frequency associated with the first channel. However, in further examples, the processing system may send a signal that controls selection of channels by a quadrature amplitude modulation (QAM) tuner or a clear QAM tuner. In a further example still, the processing system may send a signal to a satellite tuner that causes the tuner to tune to a satellite transponder with associated with a satellite television channel that corresponds to the first channel. Although step 412 is described in the context of tuning a display device, it will be appreciated that the content from the first channel may be presented on the display device in other manners that do not involve tuning the display device. For instance, the content on the first channel may simply be retrieved directly from storage in the network, without changing the tuning of the display device.

In step 414, the processing system may receive a command from the user via the input device that delays playback of the program currently being aired on the first channel. For instance, the command may comprise a command to pause the program that is currently being aired, so that the user may answer the phone, use the restroom, get a snack, or the like. Alternatively, the command may comprise a command to rewind the program currently being aired, so that the user may re-watch a scene, replay audio that was difficult to hear, or the like.

In step 416, the processing system may buffer a portion of a content stream airing over a second channel of the plurality of channels in response to the command, where the second channel of the plurality of channels is associated in the schedule with a second time slot of the plurality of time slots. The second time slot may occur later in the schedule than the first time slot. The buffering of the content stream airing over the second channel may not begin until the second time slot begins, or just before (e.g., x seconds before) the second time slot begins. Furthermore, the buffering may occur while the display device is still tuned to the first channel.

Buffering of the content stream airing over the second channel may ensure that a delay in playback on the first channel does not cause the user to miss any of the program airing later on the second channel. For instance, a user may typically watch a first program on a first channel, and then watch a second program on a second channel immediately after the first program ends. Conventionally, if the user paused the first program for ten minutes and then resumed playback of the first program, the user would not finish the first program until the second program had already started. Thus, when the user subsequently tuned to the second channel, he or she would have missed roughly the first ten minutes of the second program. However, buffering the content stream as described in step 416 ensures that, even if the user pauses the first program, he or she will still be able to view the second program in the second program's entirety.

Thus examples of the present disclosure allow a user to launch a personalized television channel (e.g., personalized media stream) that will automatically tune the user's display device to different channels at different times of day, based on learned viewing habits of the user. Thus, the user will not have to manually tune the display device each time he or she wishes to change the channel to view a program that he or she regularly watches. For instance, the personalized channel may automatically tune the display device to the user's favorite cable news channel for several hours in the morning, then automatically tune to a children's programming channel in the afternoon, and then automatically tune to a cable movie channel in the evening. Thus, the personalized television channel may present a continuous stream of content from a plurality of different television channels, where the content is personalized for the user based on the user's viewing habits. In some examples, the user may also be able to share his or her personalized television channel with others, e.g., by providing a secure hyperlink, a limited duration login and password, or other mechanism that allows another user (e.g., a friend or family member) to view the user's personalized television channel.

After step 412 or step 416, the method 400 may return to step 406 and proceed as described above to determine the current time. Thus, for as long as the personalized channel remains active (e.g., as long as the user does not change the channel manually, turn off the television, or otherwise deactivate the personalized channel), the processing system will continue to automatically tune to the channels indicated in the user-specific schedule during the designated time slots.

Although not expressly specified above, one or more steps of the method 200 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 4 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 5 depicts a high-level block diagram of a computing device specifically programmed to perform the functions described herein. For example, any one or more components or devices illustrated in FIG. 1 or described in connection with the method 200 or the method 400 may be implemented as the system 500. For instance, a scheduling server (such as might be used to perform the method 200) or a user endpoint device (such as might be used to perform the method 400) could be implemented as illustrated in FIG. 5.

As depicted in FIG. 5, the system 500 comprises a hardware processor element 502, a memory 504, a module 505 for providing television channels that are personalized for specific users, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for providing television channels that are personalized for specific users may include circuitry and/or logic for performing special purpose functions relating to modeling a pool of media content and available transcoding resources and to optimization allocation of the available transcoding resources among the pool of media content. The input/output devices 506 may include, for example, a camera, a video camera, storage devices (including but not limited to, a tape drive, a floppy drive, a hard disk drive or a compact disk drive), a receiver, a transmitter, a display, an output port, a television tuner card, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for providing television channels that are personalized for specific users (e.g., a software program comprising computer-executable instructions) can be loaded into memory 504 and executed by hardware processor element 502 to implement the steps, functions or operations as discussed above in connection with the example method 200 or the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing television channels that are personalized for specific users (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
receiving, by a processing system including at least one processor, a signal from a user via an input device indicating that the user wishes to launch a personalized media stream on a display device of the user;
determining, by the processing system, a current time;
identifying, by the processing system, a first time slot of a schedule into which the current time falls, wherein the schedule comprises a plurality of time slots including the first time slot;
identifying, by the processing system, a first channel that is associated in the schedule with the first time slot, wherein the first channel is one of a plurality of channels, and wherein viewing history data for the user indicates that the user has viewed the first channel during the first time slot in the past;
automatically tuning, by the processing system, the display device of the user to the first channel in response to the signal;
receiving, by the processing system and subsequent to the automatically tuning, a command from the user via the input device to pause a program playing on the first channel;
identifying, by the processing system, a second channel associated in the schedule with a second time slot of the plurality of time slots, wherein the second time slot occurs later in time than the first time slot;
buffering, by the processing system, a portion of a program being shown on the second channel during the second time slot, in response to the command and when the second time slot begins, wherein the buffering begins while the display device is still tuned to the first channel, and wherein the portion having a duration determined based on a duration of a pause initiated by the command, to ensure the program on the second channel can be seen in its entirety; and presenting, by the processing system, to the display device the portion of the program on the second channel that is buffered after an end of the program on the first channel and without altering the schedule.

2. The method of claim 1, wherein the schedule further associates a plurality of other channels of the plurality of channels with a plurality of other time slots of the plurality of time slots.

3. The method of claim 1, further comprising:
detecting, by the processing system, when a new current time falls into a third time slot of the plurality of time slots, wherein the third time slot occurs subsequent to the first time slot; and
automatically tuning, by the processing system, the display device of the user to a third channel of the plurality of channels that is associated in the schedule with the third time slot, when the new current time is detected to fall into the third time slot.

4. The method of claim 1, wherein the processing system is part of the display device.

5. The method of claim 4, wherein the display device is a smart television.

6. The method of claim 1, wherein the processing system is part of a device that receives signals over a communications network and extracts television content from the signals for display on the display device.

7. The method of claim 6, wherein the device is at least one of: a set top box, a streaming media player, or a microconsole.

8. The method of claim 1, wherein the processing system is part of a server that communicates with the display device over a communications network.

9. The method of claim 8, further comprising, prior to the receiving:
collecting, by the processing system, the viewing history data of the user, wherein the viewing history data includes a subset of the plurality of channels, including the first channel, that the user has been observed to have watched on the display device in the past and times in the past at which the user was observed to have watched the subset of the plurality of channels;
detecting, by the processing system, a pattern in the viewing history data based on an analysis of the viewing history data; and
constructing, by the processing system, the schedule based on the pattern.

10. The method of claim 9, wherein the constructing comprises:
associating, by the processing system, the first channel with the first time slot when the viewing history data shows at least a threshold number of occurrences of the user watching the first channel during the first time slot.

11. The method of claim 10, wherein the constructing further comprises:
associating, by the processing system, an automatically selected channel of the plurality of channels with a third time slot of the plurality of time slots, when the viewing history data shows fewer than the threshold number of occurrences of the user watching a same channel during the third time slot.

12. The method of claim 11, wherein the automatically selected channel comprises a channel that is offered by a programming provider but is excluded from a channel package offered by the programming provider to which the user subscribes.

13. The method of claim 11, wherein the automatically selected channel shows a program during the third time slot that is observed to share a commonality with the program shown on the first channel during the first time slot.

14. The method of claim 13, wherein the commonality includes at least one of: a common genre, a common actor, a common writer, or a common sports team.

15. The method of claim 9, wherein the constructing comprises:
determining, by the processing system based on the viewing history data, that the user has watched both the first channel and a third channel of the plurality of channels during the first time slot;
presenting, by the processing system, the user with a choice between the first channel and the third channel; and
receiving, by the processing system in response to the presenting, a selection of the first channel from the user.

16. The method of claim 1, further comprising:
delivering, by the processing system to the display device, a photograph belonging to the user for display during at least one time slot of the plurality of time slots.

17. The method of claim 1, wherein the presenting comprises:
automatically tuning, by the processing system, the display device to the second channel when the end of the program playing on the first channel is reached, wherein the end of the program playing on the first channel is reached during the second time slot; and
delivering, by the processing system, the portion of the program being shown on the second channel during the second time slot to the display device from the buffer, so that the command from the user to pause the program playing on the first channel does not cause the user to miss a beginning of the program being shown on the second channel.

18. The method of claim 1, further comprising:
delivering, by the processing system to the display device, information related to an internet search executed by the user during at least one time slot of the plurality of time slots.

19. A device comprising:
a processing system including at least one processor; and
a computer-readable medium storing instructions which, when executed by the processing system, cause the processing system to perform operations, the operations comprising:
receiving a signal from a user via an input device indicating that the user wishes to launch a personalized media stream on a display device of the user;
determining a current time;
identifying a first time slot of a schedule into which the current time falls, wherein the schedule comprises a plurality of time slots including the first time slot;
identifying a first channel that is associated in the schedule with the first time slot, wherein the first channel is one of a plurality of channels, and wherein viewing history data for the user indicates that the user has viewed the first channel during the first time slot in the past;
automatically tuning the display device of the user to the first channel in response to the signal;
receiving, subsequent to the automatically tuning, a command via the input device from the user to pause a program playing on the first channel;

identifying a second channel associated in the schedule with a second time slot of the plurality of time slots, wherein the second time slot occurs later in time than the first time slot;

buffering a portion of a program being shown on the second channel during the second time slot, in response to the command and when the second time slot begins, wherein the buffering begins while the display device is still tuned to the first channel, and wherein the portion having a duration determined based on a duration of a pause initiated by the command, to ensure the program on the second channel can be seen in its entirety; and presenting to the display device the portion of the program on the second channel that is buffered after an end of the program on the first channel and without altering the schedule.

20. A non-transitory computer-readable medium storing instructions which, when executed by a processing system including at least one processor, cause the processing system to perform operations, the operations comprising:

receiving a signal from a user via an input device indicating that the user wishes to launch a personalized media stream on a display device of the user;

determining a current time;

identifying a first time slot of a schedule into which the current time falls, wherein the schedule comprises a plurality of time slots including the first time slot;

identifying a first channel that is associated in the schedule with the first time slot, wherein the first channel is one of a plurality of channels, and wherein viewing history data for the user indicates that the user has viewed the first channel during the first time slot in the past;

automatically tuning the display device of the user to the first channel in response to the signal;

receiving, subsequent to the automatically tuning, a command from the user via the input device to pause a program playing on the first channel;

identifying a second channel associated in the schedule with a second time slot of the plurality of time slots, wherein the second time slot occurs later in time than the first time slot;

buffering a portion of a program being shown on the second channel during the second time slot, in response to the command and when the second time slot begins, wherein the buffering begins while the display device is still tuned to the first channel, and wherein the portion having a duration determined based on a duration of a pause initiated by the command, to ensure the program on the second channel can be seen in its entirety; and presenting to the display device the portion of the program on the second channel that is buffered after an end of the program on the first channel and without altering the schedule.

* * * * *